United States Patent Office 2,962,359
Patented Nov. 29, 1960

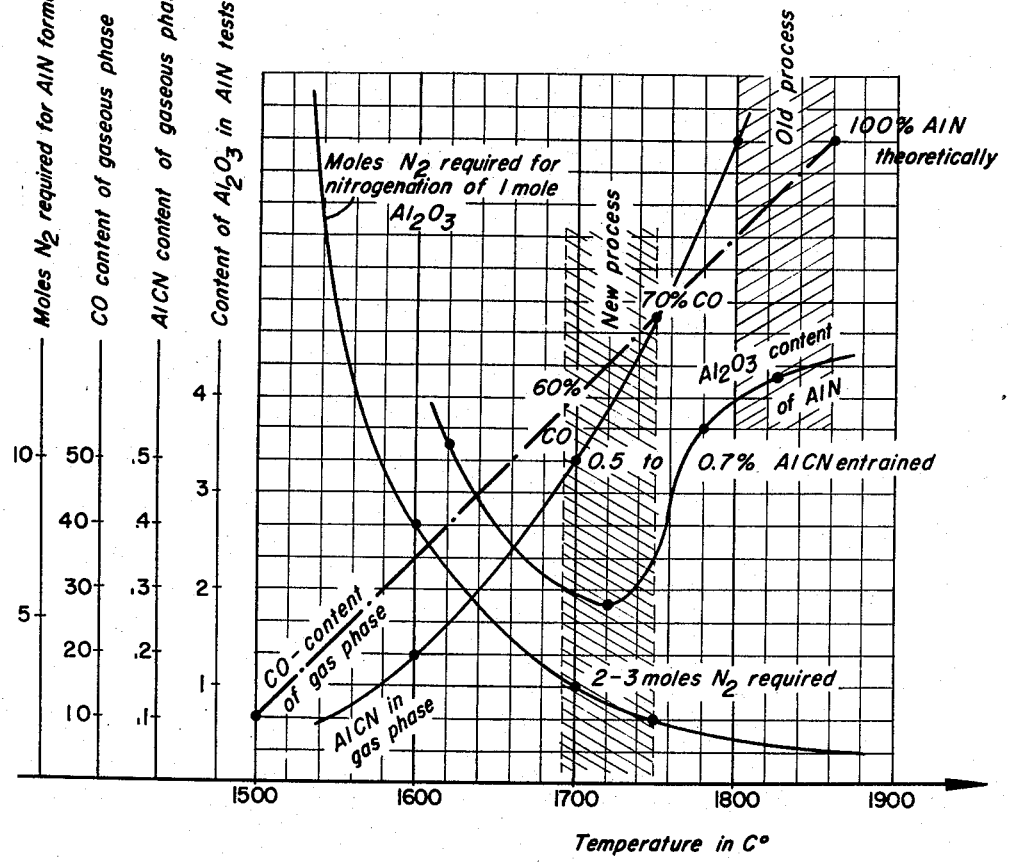

2,962,359

PROCESS FOR MAKING ALUMINUM NITRIDE

René Périères, La Tronche, and Raymond Bollack, Chedde, France, assignors to Pechiney Compagnie de Produits Chimiques et Electrometallurgiques, Paris, France Filed July 15, 1957, Ser. No. 671,980

Claims priority, application France July 31, 1956

9 Claims. (Cl. 23—192)

This invention relates to a process for making aluminum nitride, and more particularly to the production of aluminum nitride having a degree of purity above 97%.

It is an object of our invention to provide a process for making aluminum nitride which contains impurities of not more than 3% and is, therefore, particularly free from any substantially amounts of alumina or carbon, being thereby better suited for the production of aluminum metal therefrom than the conventionally produced AlN.

Technical aluminum nitride is conventionally obtained by heating at a high temperature briquettes consisting of a mixture of alumina and carbon in a nitrogen stream according to the reaction:

$$Al_2O_3 + 3C + N_2 \rightleftarrows 2AlN + 3CO$$

To achieve this reaction, a temperature ranging between 1600 and 2000° C. is mentioned in the literature, and conventionally a temperature range above 1800° C. was considered the optimum range.

However, it is not possible in such a way to obtain high grade aluminum nitride containing more than 90% nitride, on an industrial scale, because the transformation of alumina under these conditions is not complete and the nitride is found to contain substantial amounts of alumina and carbon.

The presence of alumina and carbon in aluminum nitride in amounts of up to 10% make the production of aluminum metal by way of thermal dissociation of AlN very cumbersome and uneconomical. It is, therefore, of great importance to have available a technical aluminum nitride of 97% purity and higher for the production of aluminum metal by thermal dissociation.

This object is achieved by the process of our present invention which results in the production of aluminum nitride having a desired AlN content higher than 97%, and a low alumina and carbon content, and preferably containing only one of these impurities in quantities below 3%, which process comprises the step of causing gaseous nitrogen of a commercial grade of purity to react with an intimate mixture of alumina and carbon at a temperature in the range below 1750° C. and above 1660° C. and preferably at about 1700° C.

Surprisingly, we found that the nitridation step yields a purer alumina nitride at this lower temperature range than at the conventionally preferred range of 1800° C. and higher.

It was further generally assumed in the art, that by prolonging the heating step in a nitrogen stream, the quality of the resulting nitride could be improved and that especially its $Al_2O_3$ content could be lowered.

Again, we discovered, that this assumption is fallacious, and that, as another feature of our invention, the heating period should be terminated at a determined instant in the process as shall be set forth in detail hereinafter.

Our invention is based on a number of discoveries which we made in studying the above-mentioned process of nitridation, in which the equilibrium is univariant, at least in a first approximation, considering $Al_2O_3$ and 3C as constant. Thus, we found that the gaseous phase in equilibrium has a composition which is well defined at a given temperature. The CO-content of the gaseous phase varies with temperature as follows:

10% at 1500° C.
30% at 1600° C.
60% at 1700° C.
85% at 1800° C.

Therefore, the number of moles of nitrogen theoretically required at each temperature to convert one mole of $Al_2O_3$ into nitride decreases with temperature in the following manner:

28 moles $N_2$ at 1500°C.
8 moles $N_2$ at 1600° C.
3 moles $N_2$ at 1700° C.
1.5 moles $N_2$ at 1800° C.

From these findings it would seem that nitridation above 1800° C. would yield the most favorable results, since firstly, it requires less nitrogen, and, secondly, the reaction velocity of the nitrodation reaction increases like that of any other reaction, exponentially with temperature.

However, we discovered that, surprisingly enough, it is of no advantage, neither from an economical nor from a technological point of view, to raise the reaction temperature beyond 1750° C., and that best results were obtained if an even lower temperature down to about 1650° C., but preferably of about 1700° C. was maintained.

We found that this is due to a side reaction:

$$\underset{\text{solid}}{AlN} + \underset{\text{solid}}{C} \longrightarrow \underset{\text{gas}}{AlCN}$$

the magnitude of which compared to that of the above-mentioned main reaction $$Al_2O_3 + 3C + N_2 \rightleftarrows 2AlN + 3CO$$

is small at 1700° C. but increases with temperature. In generating a gaseous compound of monovalent aluminum, aluminum mono-cyanide, this reaction causes nitride losses which can reach high levels according to the temperature and the length of time of the nitridation process.

Thus, at 1600° C., the gaseous mixture which leaves the nitridation zone carries along about 0.2% of its weight of nitride in the form of AlCN. This impurity amounts to 0.5% at 1700° C. and to about 1% at 1800° C. Apart from the resulting loss in efficiency of the process, the condensation of this unstable compound according to the reverse reaction:

$$\underset{\text{gas}}{AlCN} \longrightarrow \underset{\text{solid}}{AlN} + \underset{\text{solid}}{C}$$

causes as a further serious drawback a progressive clogging of the colder parts of the nitridation furnace. This compound AlCN was already described in French Patent 1,135,536 published on April 30, 1957, one of us being a co-inventor thereof.

We also discovered that, as a further drawback when operating conventionally at temperatures above 1750° C., the reaction velocity of the alumina reduction by carbon increases much faster than the diffusion velocity of nitrogen in nitridation mass. The latter increases only at a rate which is probably a function of $\sqrt{T}$ only, T being absolute temperature measured in degrees Kelvin. Therefore, although it is difficult to give generally applicable data since both velocities depend, apart from the temperature of the reaction mass, also on various other variable factors such as degree of granulation and porosity, it can be stated that we found it to be very difficult to ensure above 1750° C. a sufficiently rapid diffusion of nitrogen into the carbon-alumina reaction mass to prevent in the latter the formation of local melts which cause the grains in the mass to become tacky and stick together. These highly undesirable local melts are probably due to the formation of low-melting eutectic mixtures between aluminum, $Al_2O_3$ and $Al_2O$, formed in the aforesaid preponderant reaction involving a partial reduction of alumina with carbon.

Naturally, the melting and caking effects in the reaction mass lead to a considerable loss of porosity thereof and consequently to a further decrease in the rate of diffusion of nitrogen thereinto, so that a complete nitridation of the mass is made impossible, irrespective of the length of time of the treatment. This phenomenon is particularly prejudicial to the final product which then contains excessive amounts of alumina. Also, the formation of hangings in the reaction furnace due to tacky deposits on the walls of the same are harmful and shorten the lifetime of the furnace.

We have determined the alumina content in aluminum nitride obtained at various reaction temperatures, from a test charge of 90 grams composed of 64 grams of pulverulent $Al_2O_3$ and 26 grams of carbon powder. The grain size of the mixture was held between 4 and 8 millimeters and the alumina carbon mass had a porosity of between 45 and 50% by volume. The tests were carried out at a rate of nitrogen flow of 0.4 liter per minute (which constituted an excess amount in each test) and the treatment was interrupted in each case when the CO-content of the waste gases had practically disappeared. The results were as follows:

| Temperature | Time of treatment, hours | Aluminum oxide content calculated as $Al_2O_3$ |
|---|---|---|
| 1,625° | 8 | 3.5 |
| 1,725° | 8 | 1.8 |
| 1,775° | 8 | 3.7 |
| 1,825° | 6 | 4.2 |

We discovered, surprisingly, that the aluminum oxide content shows a minimum at about 1725° C., within the time limit determined in each test as explained above.

The various factors determined by us as contributing to the formation of an aluminum nitride of 97% nitride content in the process according to our invention are illustrated in Graph I in the accompanying drawing and clearly show why the range of 1650 to 1750° C. to be used in the process according to our invention is distinguished from the broad temperature range from 1600 to 2000° C. and the hitherto preferred range above 1800° C.

As has been stated hereinbefore, we have further discovered that, contrary to expectation, the quality of the resulting nitride cannot be improved and no decrease in its alumina content can be achieved by a prolonged heating of the reaction mass.

On the contrary, we have found that prolonged heating has the two following drawbacks:

Firstly, an increase in losses through volatilization of the subcyanide (AlCN) formed from carbon and preformed nitride, and consequently a drop in efficiency of the process and a risk of clogging the nitridation furnace.

Secondly, an increase in the brittleness of the briquettes of the charge, hence a further drop in efficiency and a still greater risk of clogging the furnace. This increase in brittleness of the briquettes of the charge is not solely due to the increase in porosity in consequence of AlCN volatilization, but is also due to a directed and progressive crystallization of the nitride being formed.

Now, we have found that, as a further important feature of the process according to our invention, it is advisable to discontinue nitridation as soon as the carbon monoxide content in the gas evolved at the furnace outlet has decreased to that content which could be found in the gas leaving the empty furnace in the case of a trial run of the latter at normal operating temperatures, but without a charge and in discontinuous or batch operation. A certain CO-content is then to be found in the gas, which CO originates from the carbonaceous lining of the furnace and residual oxygen always present in the commercial nitrogen used.

As yet another important feature of the process according to our invention, we have found that at the operating temperatures proposed by us, i.e. above 1650° C., and already above 1600° C., there exists a critical lower limit for the rate of flow of nitrogen past the reaction mass, which insures a minimum amount of $N_2$ reacting with the mixture of alumina and carbon. If, anywhere in the reaction furnace, the rate of flow of nitrogen falls below that critical limit, the reaction of alumina reduction will become preponderant over that of aluminum nitridation. This will automatically bring about the above-mentioned drawbacks of local melts forming in the reaction mass and causing the grains of the latter to stick together, and forming tacky hangings in the furnace, with the inevitable result that nitridation remains incomplete, due to lack of nitrogen diffusion into the mass, regardless of the length of time of subsequent treatment of the reaction mass in a current of nitrogen.

It is easier to provide for an actual nitrogen rate of flow higher than the critical minimum, in all parts of the furnace, by choosing a furnace in which the charge fills almost the entire cross section traversed by the nitrogen stream. Since, it is better to avoid dust as far as possible, the charge consists, for instance, of briquettes of the alumina and carbon mixture, having gauged sizes preferably between 5 and 20 millimeters.

In a given furnace and depending on the available type of alumina-carbon briquettes, it is easy to determine experimentally by trial runs and observation whether local meltings and caking appear in the furnace interior, which nitrogen rate of flow represents the practical limit below which it is not safe to run the furnace.

Exact values for the minimum rate of nitrogen flow depend on various factors and, in particular, on the carbon reactivity of the charge, the degree of uniformity of the flooding of the charge with nitrogen and on the temperature distribution in the furnace. The optimal rate of nitrogen flow can, however, be easily determined experimentally by an analysis of the waste gases escaping from the furnace. The nitrogen rate of flow at the furnace inlet must be set sufficiently high to ensure that the nitrogen content of the waste gases at the outlet to exceed the value corresponding to equilibrium at the temperature of the part of the nitridation zone having the lowest temperature of the entire zone.

For example, if the lowest temperature region of the charge is at 1700° C., the gases at the outlet must contain at least 40° nitrogen. If the lowest temperature region of the charge is at 1600° C., the gases at the outlet should contain 70% nitrogen. In no case, however, is it necessary for this content of 70% be exceeded, for below 1600° C., meltings or caking can no longer occur in the charge. As a general rule, the nitrogen flow rate should not be less than corresponding to 30% $N_2$ content in the waste gases, and not in excess of a rate corresponding to 70%, to avoid unnecessary losses of nitrogen.

The porosity of the alumina-carbon briquettes must be sufficient to let nitrogen penetrate to the heart of the briquette; otherwise the drawbacks mentioned above would occur inside each briquette. Excellent pratical results are obtained with briquettes having 50% porosity, but this figure may vary between very broad limits.

In industrial practice, one is often induced to increase the stoichiometric or thermodynamic proportions of some components in order to more surely realize the reactions of a type similar to those of the present process.

However, in the present case the excess of carbon which is indeed indispensable as we have found by experiments, is not added solely in following the usual requirements of industrial practice in order to exceed the stoichiometric proportions in the equation:

$$Al_2O_3 + 3C + N_2 \rightleftarrows 2AlN + 3CO$$

For this equilibrium equation does not take into account the losses which are due to the parallel reaction:

$$AlN + C \rightleftarrows AlCN$$
$$\text{solid} \quad \text{solid} \quad \text{gas}$$

which phenomenon of a secondary reaction was not hitherto known.

By our discovery that the two aforesaid reactions play a part in the production of aluminum nitride from nitrogen alumina and carbon, we have been able to determine as a further important feature of our invention, that excess of carbon in the reaction mixture, which is required to achieve a 100% nitridation of the alumina therein. It will be clear from the above explanations, that this amount must always be greater than the amount theoretically required to reduce alumina with carbon and nitride, and we prefer to use an excess even above the amount of carbon theoretically required by the aforesaid nitridation of $Al_2O_3$ plus the replacement of the loss of carbon due to AlCN formation. Therefore, the aluminum nitride having a very low alumina content, as it is obtained by the above-described steps of the process of our invention, usually contains a certain amount in the order of 4.2% of free carbon. This carbon content may then be reduced, in a subsequent step of the process according to our invention, by elimination thereof through a mild combustion treatment. Thereby, carbon is burnt and escapes from the nitride mass and the carbon content can be reduced to as little as about 0.35%. We have found that aluminum nitride is not liable to become oxidized by air or oxygen-containing gases up to temperatures slightly above 800° C. Consequently, the remaining carbon content in the aluminium nitride can be completely and safely removed by burning the carbon off at temperatures ranging between 600° and 800° C.

Care must, of course, be taken to prevent the heat evolved by the carbon combustion to increase the temperature of the treated nitride to above 800° C. or even about 850° C., at which temperature nitride oxidation begins to be noticeable. In order to dissipate the heat of combustion, it is sufficient to resort to known methods, such as, for instance, dilution of the oxidizing gas by nitrogen or carbon dioxide. Another convenient mode of carrying out this step of carbon elimination in the process of the invention consists in admixing water vapor to the oxidizing gas, which vapor, surprisingly enough, does not attack aluminum nitride at the stated temperature range contrary to expectation. This can be explained by the fact that, in this case, the exothermal nature of the combustion reaction is limited by the endothermal nature of water gas formation which occurs when water vapor reacts with carbon.

The process according to the invention is further illustrated by a number of examples given below which are, however, not meant to be limitative in any way:

*Example I*

In a graphite vertical collar of 28 centimeters' internal diameter and externally heated to a uniform temperature of 1700° C. there are charged:

23 kilograms alumina-carbon briquettes of 7 to 15 millimeters' diameter grain size, prepared from 16.5 kg. of Bayer alumina and 6.5 kg. of pure coke which passes through a 100 mesh sieve without a residue, the briquetted material has a porosity of about 50%.

The charge is heated to 1700° C. for two hours, while the collar is simultaneously traversed from bottom to top by a nitrogen stream of 100 liters/minute.

After cooling down to 800° C. in a nitrogen atmosphere 13.8 kg. of a product, the analysis of which shows a content of

| | Percent |
|---|---|
| AlN | 95.2 |
| C | 4.2 |
| and | |
| $Al_2O_3$ | 0.6 | is removed from the furnace.

After roasting in air at 700 to 800° C., the residual product shows the following analyses:

| | Percent |
|---|---|
| AlN | 99.0 |
| C | 0.35 |
| $Al_2O_3$ | 0.65 |

*Example II*

Through the same furnace charged with the same briquettes as in Example I, the same total quantity of nitrogen, i.e. 12,000 liters, is passed during 3 hours 20 minutes, however, at a rate of flow of 60 liters/minute, that is to say, with an instantaneous nitrogen rate of flow which is substantially lower than that of Example I.

It is found that local meltings and caking occur in the charge, and that the resulting aluminum nitride contains 17% alumina which content cannot be lowered by prolonging the treatment with nitrogen.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. In a process for producing aluminum nitride by reacting a charge containing alumina and carbon with gaseous nitrogen, the improvement which comprises maintaining a reaction temperature of 1600–1750° C. and continuously passing said gaseous nitrogen through said alumina and carbon charge at such a rate as to maintain in the exhaust gases at all times during the reaction a nitrogen concentration of at least 30% by volume and sufficient to prevent the formation of local melts, the lower the temperature, the higher the nitrogen concentration required.

2. The process of claim 1, wherein the coolest part of the reaction mass is 1700° C., and the nitrogen concentration in the exhaust gases is at least 40% by volume.

3. The process of claim 1, wherein the coolest part of the reaction mass is 1600° C. and the nitrogen concentration in the exhaust gases is 70% by volume.

4. The process of claim 1, wherein there is provided sufficient carbon to maintain an excess over the carbon required to fulfill the conditions represented by the following two equations:

(1) $Al_2O_3 + 3C + N_2 = 2AlN + 3CO$ (2) $AlN + C = AlCN$ thereby ensuring a complete reaction.

5. The process of claim 2, wherein there is provided sufficient carbon to maintain an excess over the carbon required to fulfill the conditions represented by the following two equations:

(1) $Al_2O_3 + 3C + N_2 = 2AlN + 3CO$ (2) $AlN + C = AlCN$ thereby ensuring a complete reaction.

6. The process of claim 1, wherein the nitridation is immediately discontinued after the carbon monoxide content of the exhaust gas is lowered to that value corresponding to the carbon monoxide content found in the exhaust gases when there is no carbon and alumina charge in the furnace.

7. The process of claim 2, wherein the nitridation is immediately discontinued after the carbon monoxide content of the exhaust gas is lowered to that value corresponding to the carbon monoxide content found in the exhaust gases when there is no carbon and alumina charge in the furnace.

8. The process of claim 4, wherein said aluminum nitride product is brought into contact with a free oxygen-containing atmosphere at a temperature between 600–850° C., whereby the carbon is burned off, thereby producing an aluminum nitride having a purity higher than 97%.

9. The process of claim 5, wherein said aluminum nitride product is brought into contact with a free oxygen-containing atmosphere at a temperature between 600–850° C., whereby the carbon is burned off, thereby producing an aluminum nitride having a purity higher than 97%.

References Cited in the file of this patent

UNITED STATES PATENTS

| 987,408 | Serpek | Mar. 21, 1911 |
| 1,030,929 | Serpek | July 2, 1912 |
| 1,393,372 | Hoopes | Oct. 11, 1921 |

FOREIGN PATENTS

| 17,611 | Great Britain | 1909 |